US010936151B2

(12) United States Patent
Younger et al.

(10) Patent No.: US 10,936,151 B2
(45) Date of Patent: *Mar. 2, 2021

(54) SYSTEM AND METHOD FOR VOICE ACTIVATED PROVISIONING OF TELECOMMUNICATION SERVICES

(71) Applicant: CenturyLink Intellectual Property LLC, Denver, CO (US)

(72) Inventors: Keith Younger, Overland Park, KS (US); Shane M. Smith, Paola, KS (US); Kendra Dwyer, Wellsville, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 351 days.

This patent is subject to a terminal disclaimer.

(21) Appl. No.: 13/926,475

(22) Filed: Jun. 25, 2013

(65) Prior Publication Data

US 2013/0290900 A1    Oct. 31, 2013

Related U.S. Application Data

(63) Continuation of application No. 12/261,555, filed on Oct. 30, 2008, now Pat. No. 8,494,140.

(51) Int. Cl.
*G06F 3/0482* (2013.01)
*G10L 15/22* (2006.01)
(Continued)

(52) U.S. Cl.
CPC .......... *G06F 3/0482* (2013.01); *H04M 1/642* (2013.01); *H04M 3/4936* (2013.01); *G06F 3/13* (2013.01);
(Continued)

(58) Field of Classification Search
CPC .......... G06F 3/16; G06F 3/167; G06F 3/0481; G06F 3/0482; H04M 3/4936; H04M 1/642; H04M 2201/40; G10L 15/22
(Continued)

(56) References Cited

U.S. PATENT DOCUMENTS 4,456,788 A    6/1984 Kline et al.
4,669,113 A    5/1987 Ash et al.
(Continued)

FOREIGN PATENT DOCUMENTS

EP    1235415 A2    2/1998

OTHER PUBLICATIONS

Lynuxworks, "Pulsar's WavPort Voice-Activated Services," Web Site http://www.lynuxworks.com/solutions/telecom/in-action/pulsar.php3; Accessed on Sep. 22, 2008.
(Continued)

*Primary Examiner* — Christopher J Fibbi
*Assistant Examiner* — Le V Nguyen

(57) ABSTRACT

A system and method for provisioning communications services. A remote device controlled by a user is linked with a provisioning system. A verbal selection of a menu associated with a library is received for performing one or more actions within the provisioning system. One or more verbal commands associated with the menu are received. A determination is made of an action within the library associated with the one or more verbal commands. The action associated with the one or more verbal commands is performed in the provisioning system to provision the communications services.

20 Claims, 4 Drawing Sheets

(51) Int. Cl.
  *H04M 3/493* (2006.01)
  *H04M 1/64* (2006.01)
  *G06F 3/13* (2006.01)

(52) U.S. Cl.
  CPC ......... *G10L 15/22* (2013.01); *H04M 2201/40* (2013.01)

(58) Field of Classification Search
  USPC .......................................... 715/728–729, 740
  See application file for complete search history.

(56) References Cited

U.S. PATENT DOCUMENTS

| | | | |
|---|---|---|---|
| 4,756,019 A | 7/1988 | Szybicki | |
| 4,776,016 A | 10/1988 | Hansen | |
| 5,054,096 A | 10/1991 | Beizer | |
| 5,526,408 A | 6/1996 | Yekutiely | |
| 5,687,224 A | 11/1997 | Alley, Jr. et al. | |
| 5,774,859 A * | 6/1998 | Houser | H04N 5/44543 348/E5.103 |
| 5,844,823 A | 12/1998 | Mishra | |
| 5,884,284 A | 3/1999 | Peters et al. | |
| 5,920,846 A | 7/1999 | Storch et al. | |
| 5,945,910 A * | 8/1999 | Gorra | 340/573.1 |
| 5,999,932 A | 12/1999 | Paul | |
| 6,020,884 A * | 2/2000 | MacNaughton | G06F 17/3089 707/E17.116 |
| 6,021,371 A * | 2/2000 | Fultz | G01C 21/3608 340/988 |
| 6,028,924 A | 2/2000 | Ram et al. | |
| 6,104,798 A | 8/2000 | Lickiss et al. | |
| 6,122,632 A | 9/2000 | Botts et al. | |
| 6,137,873 A | 10/2000 | Gilles | |
| 6,219,648 B1 | 4/2001 | Jones et al. | |
| 6,226,286 B1 | 5/2001 | Danne et al. | |
| 6,233,560 B1 | 5/2001 | Tannenbaum | |
| 6,285,748 B1 | 9/2001 | Lewis | |
| 6,349,238 B1 | 2/2002 | Gabbita et al. | |
| 6,385,609 B1 | 5/2002 | Barshefsky et al. | |
| 6,389,126 B1 | 5/2002 | Bjornberg et al. | |
| 6,397,186 B1 * | 5/2002 | Bush et al. | 704/274 |
| 6,636,831 B1 | 10/2003 | Profit et al. | |
| 6,647,105 B1 | 11/2003 | Gilles | |
| 6,650,738 B1 | 11/2003 | Pershan et al. | |
| 6,707,903 B2 | 3/2004 | Burok et al. | |
| 6,724,876 B2 | 4/2004 | Williams et al. | |
| 6,778,638 B1 | 8/2004 | Jean et al. | |
| 6,795,537 B1 | 9/2004 | Gilbert | |
| 6,826,146 B1 * | 11/2004 | Blenis | H04Q 3/66 370/227 |
| 6,865,268 B1 | 3/2005 | Matthews et al. | |
| 6,885,736 B2 | 4/2005 | Uppaluru | |
| 6,889,339 B1 * | 5/2005 | D'Amico et al. | 714/4.4 |
| 6,912,581 B2 | 6/2005 | Johnson et al. | |
| 6,934,552 B2 | 8/2005 | Holley et al. | |
| 6,937,701 B1 | 8/2005 | Gold | |
| 6,937,993 B1 | 8/2005 | Gabbita et al. | |
| 7,012,997 B1 | 3/2006 | Mednieks | |
| 7,142,655 B2 | 11/2006 | Malinowski et al. | |
| 7,221,912 B2 | 5/2007 | Nelson et al. | |
| 7,221,938 B2 | 5/2007 | Romeo | |
| 7,289,605 B1 | 10/2007 | Jean et al. | |
| 7,308,094 B1 | 12/2007 | Jean et al. | |
| 7,436,939 B1 | 10/2008 | Packingham et al. | |
| 7,623,647 B1 * | 11/2009 | Croak | H04M 3/436 370/352 |
| 7,660,402 B1 | 2/2010 | Dwekat et al. | |
| 7,734,958 B1 * | 6/2010 | Di Fabbrizio | G06F 9/451 714/38.14 |
| 8,121,586 B2 | 2/2012 | Araradian et al. | |
| 8,230,081 B2 * | 7/2012 | Roberts et al. | 709/228 |
| 8,311,835 B2 | 11/2012 | Lecoeuche | |
| 8,494,140 B2 | 7/2013 | Younger et al. | |
| 8,503,665 B1 * | 8/2013 | Meisel | H04M 3/4936 379/265.02 |
| 8,639,214 B1 * | 1/2014 | Fujisaki | 455/406 |
| 9,736,230 B2 | 8/2017 | Bugenhagen | |
| 2001/0038689 A1 | 11/2001 | Liljestrand et al. | |
| 2001/0056307 A1 * | 12/2001 | Theimer | G06F 3/0481 700/90 |
| 2002/0111842 A1 | 8/2002 | Miles | |
| 2002/0140741 A1 * | 10/2002 | Felkey et al. | 345/810 |
| 2003/0046184 A1 | 3/2003 | Bjorklund et al. | |
| 2003/0084088 A1 | 5/2003 | Dreyer et al. | |
| 2003/0130820 A1 | 7/2003 | Lane, III | |
| 2004/0024862 A1 | 2/2004 | Wall et al. | |
| 2004/0043758 A1 | 3/2004 | Sorvari et al. | |
| 2004/0261116 A1 * | 12/2004 | Mckeown et al. | 725/109 |
| 2004/0267586 A1 | 12/2004 | McDougal et al. | |
| 2005/0096906 A1 * | 5/2005 | Barzilay | G10L 15/26 704/249 |
| 2005/0238145 A1 | 10/2005 | Knott et al. | |
| 2006/0013367 A1 * | 1/2006 | Sawyer et al. | 379/88.01 |
| 2006/0064729 A1 * | 3/2006 | Steading | H04L 12/5695 725/95 |
| 2006/0074658 A1 | 4/2006 | Chadha | |
| 2007/0136072 A1 | 6/2007 | Sampath | |
| 2007/0263798 A1 * | 11/2007 | Dewing et al. | 379/88.13 |
| 2008/0004013 A1 * | 1/2008 | Polzin | H04L 63/102 455/435.1 |
| 2008/0021598 A1 * | 1/2008 | Daude et al. | 701/1 |
| 2008/0059188 A1 * | 3/2008 | Konopka et al. | 704/257 |
| 2008/0152126 A1 * | 6/2008 | Pitkamaki | H04M 1/6066 379/418 |
| 2008/0207167 A1 * | 8/2008 | Bugenhagen | H04Q 3/0062 455/411 |
| 2008/0212748 A1 | 9/2008 | Stillman et al. | |
| 2008/0220810 A1 * | 9/2008 | Landschaft et al. | 455/550.1 |
| 2008/0300886 A1 * | 12/2008 | Patch | 704/275 |
| 2009/0022285 A1 * | 1/2009 | Swanburg | H04M 7/0033 379/88.11 |
| 2009/0271203 A1 * | 10/2009 | Resch | G10L 17/00 704/275 |
| 2010/0111269 A1 | 5/2010 | Younger et al. | |
| 2010/0299199 A1 * | 11/2010 | Kang | 705/14.49 |

OTHER PUBLICATIONS

U.S. Appl. No. 10/610,117; Decision on Petition for Withdrawal of the Holding of Abandonment dated Mar. 30, 2009.
U.S. Appl. No. 10/610,117; Decision on Petition to Revive Unintentionally Abandoned Patent dated May 6, 2009.
U.S. Appl. No. 10/610,117; Final Rejection dated Jul. 31, 2009.
U.S. Appl. No. 10/610,117; Non-Final Rejection dated Dec. 24, 2009.
U.S. Appl. No. 10/610,117; Non-Final Rejection dated Mar. 18, 2008.
U.S. Appl. No. 10/610,117; Notice of Abandonment dated Sep. 26, 2008.
U.S. Appl. No. 10/610,117; Notice of Allowance dated Apr. 2, 2010.
U.S. Appl. No. 10/610,117; Petition for Withdrawal of the Holding of Abandonment and Amendment dated Mar. 12, 2009.
U.S. Appl. No. 10/610,117; Petition to Revive Unintentionally Abandoned Patent Application and Amendment dated Apr. 10, 2009.
U.S. Appl. No. 10/610,117; RCE/Amendment filed Sep. 23, 2009.
U.S. Appl. No. 10/610,117; Response filed Jan. 12, 2010 to Non-Final Rejection dated Dec. 24, 2009.
U.S. Appl. No. 10/610,118; Final Office Action dated Dec. 24, 2008.
U.S. Appl. No. 10/610,118; Final Rejection dated Nov. 24, 2009.
U.S. Appl. No. 10/610,118; Non-Final Office Action dated Dec. 20, 2007.
U.S. Appl. No. 10/610,118; Non-Final Office Action dated Jul. 28, 2008.
U.S. Appl. No. 10/610,118; Non-Final Rejection dated Apr. 14, 2009.
U.S. Appl. No. 10/610,118; Notice of Abandonment dated Jun. 1, 2010.

(56) References Cited

OTHER PUBLICATIONS

U.S. Appl. No. 10/610,118; RCE/Amendment filed Mar. 24, 2009.
U.S. Appl. No. 10/610,118; Response filed Oct. 16, 2008 to Non-Final Office Action dated Jul. 28, 2008.
U.S. Appl. No. 10/610,118; Response filed Mar. 18, 2008 to Non-Final Office Action dated Dec. 20, 2007.
U.S. Appl. No. 10/610,118; Response filed Jul. 14, 2009 to Non-Final Rejection dated Apr. 14, 2009.
U.S. Appl. No. 10/610,191; Final Office Action dated Oct. 6, 2009.
U.S. Appl. No. 10/610,191; Final Office Action dated Nov. 28, 2008.
U.S. Appl. No. 10/610,191; Non-Final Office Action dated Jan. 8, 2008.
U.S. Appl. No. 10/610,191; Non-Final Office Action dated Sep. 1, 2010.
U.S. Appl. No. 10/610,191; Non-Final Rejection dated Feb. 18, 2010.
U.S. Appl. No. 10/610,191; Non-Final Rejection dated Apr. 9, 2009.
U.S. Appl. No. 10/610,191; Notice of Non-Compliant Answer dated Aug. 11, 2008.
U.S. Appl. No. 10/610,191; Pre-Brief Appeal Conference Decision dated Jan. 6, 2010.
U.S. Appl. No. 10/610,191; Pre-Brief Conference Request and Remarks to Same; Notice of Appeal filed Nov. 12, 2009.
U.S. Appl. No. 10/610,191; RCE/Amendment dated Feb. 5, 2010.
U.S. Appl. No. 10/610,191; RCE/Response filed Jan. 23, 2009 to Final Office Action dated Nov. 26, 2008.
U.S. Appl. No. 10/610,191; Response filed Apr. 8, 2008 to Non-Final Office Action dated Jan. 8, 2008.
U.S. Appl. No. 10/610,191; Response filed May 18, 2010 to Non-Final Rejection.
U.S. Appl. No. 10/610,191; Response filed May 26, 2009 to Non-Final Rejection dated Apr. 9, 2009.
U.S. Appl. No. 10/610,191; Response filed Sep. 3, 2008 to Notice of Non-Compliant Answer dated Aug. 11, 2008.
U.S. Appl. No. 10/610,208; Advisory Action dated Jan. 28, 2009.
U.S. Appl. No. 10/610,208; Advisory Action dated Oct. 9, 2009.
U.S. Appl. No. 10/610,208; Final Office Action dated Nov. 28, 2008.
U.S. Appl. No. 10/610,208; Final Office Action dated Feb. 7, 2008.
U.S. Appl. No. 10/610,208; Final Rejection dated Mar. 29, 21010.
U.S. Appl. No. 10/610,208; Final Rejection dated Sep. 10, 2009.
U.S. Appl. No. 10/610,208; Non-Final Office Action dated Jun. 12, 2008.
U.S. Appl. No. 10/610,208; Non-Final Office Action dated Jul. 9, 2007.
U.S. Appl. No. 10/610,208; Non-Final Office Action dated Sep. 22, 2010.
U.S. Appl. No. 10/610,208; Non-Final Rejection dated Dec. 18, 2009.
U.S. Appl. No. 10/610,208; Non-Final Rejection dated Mar. 6, 2009.
U.S. Appl. No. 10/610,208; RCE/Amendment filed Oct. 27, 2009.
U.S. Appl. No. 10/610,208; RCE/Amendment filed Jun. 24, 2010.
U.S. Appl. No. 10/610,208; Response filed Jan. 12, 2010 to Non-Final Rejection dated Dec. 18, 2009.
U.S. Appl. No. 10/610,208; Response filed Nov. 9, 2007 to Non-Final Office Action dated Jul. 9, 2007.
U.S. Appl. No. 10/610,208; Response filed Dec. 29, 2008 to Final Office Action dated Nov. 28, 2008.
U.S. Appl. No. 10/610,208; Response filed May 7, 2008 to Final Office Action dated Feb. 7, 2008.
U.S. Appl. No. 10/610,208; Response filed Jun. 1, 2009 to Non-Final Action dated Mar. 6, 2009.
U.S. Appl. No. 10/610,208; Response filed Jul. 18, 2008 to Non-Final Office Action dated Jun. 12, 2008.
U.S. Appl. No. 10/610,208; Response filed Sep. 30, 2009 to Final Rejection dated Sep. 10, 2009.
U.S. Appl. No. 10/715,781; Final Office Action dated Oct. 17, 2008.
U.S. Appl. No. 10/715,781; Non-Final Office Action dated Apr. 3, 2008.
U.S. Appl. No. 10/715,781; Non-Final Rejection dated Jun. 25, 2009.
U.S. Appl. No. 10/715,781; Notice of Allowance dated Oct. 19, 2009.
U.S. Appl. No. 10/715,781; Pre-Appeal Brief filed Jan. 8, 2009 to Final Office Action dated Oct. 17, 2008.
U.S. Appl. No. 10/715,781; Pre-Brief Appeal Conference Decision dated Apr. 9, 2009.
U.S. Appl. No. 10/715,781; Response filed Jul. 1, 2008 to Non-Final Office Action dated Apr. 3, 2008.
U.S. Appl. No. 10/715,781; Response filed Aug. 11, 2009 to Non-Final Rejection dated Jun. 25, 2009.
U.S. Appl. No. 11/787,571; Response filed Nov. 4, 2010 to Restriction Requirement.
U.S. Appl. No. 11/787,571; Restriction Requirement dated Oct. 5, 2010.
U.S. Appl. No. 12/261,555; Final Rejection dated Aug. 22, 2012; 22 pages.
U.S. Appl. No. 12/261,555; Issue Notification dated Jul. 3, 2013; 1 page.
U.S. Appl. No. 12/261,555; Non-Final Rejection dated May 7, 2012; 24 pages.
U.S. Appl. No. 12/261,555; Non-Final Rejection dated Dec. 12, 2012; 25 pages.
U.S. Appl. No. 12/261,555; Non-Final Rejection dated Aug. 10, 2011; 38 pages.
U.S. Appl. No. 12/261,555; Notice of Allowance dated Mar. 25, 2013; 14 pages.
U.S. Appl. No. 12/261,555; Final Office Action dated Dec. 9, 2011;16 pages.
U.S. Appl. No. 12/261,555; Notice of Non Compliant Amendment dated Nov. 16, 2011; 2 pages.
U.S. Appl. No. 14/996,904; Notice of Allowance dated Mar. 29, 2017, 21 pages.

* cited by examiner

SYSTEM AND METHOD FOR VOICE ACTIVATED PROVISIONING OF TELECOMMUNICATION SERVICES

CROSS-REFERENCE TO RELATED APPLICATIONS

This application is a continuation of U.S. patent application Ser. No. 12/261,555, filed Oct. 30, 2008 by Keith Younger et al. and entitled, "System and Method for Voice Activated Provisioning of Telecommunication Services", the entire disclosure of which is hereby incorporated by reference.

FIELD OF THE INVENTION

The present invention relates, generally, to telecommunication systems and, more particularly, to a method and system for voice-activated provisioning of telecommunication services.

BACKGROUND OF THE INVENTION

The use of and development of communications has grown nearly exponentially in recent years. The growth is fueled by larger networks with more reliable protocols and better communications hardware available to service providers and consumers. Provisioning telecommunications circuits and resources locally and remotely is very important to meet user needs by providing communications services. Provisioning telecommunications circuits and resources may be very repetitive. In some cases, extensive data entry and training requirements increase the time and errors that occur during provisioning.

SUMMARY OF THE INVENTION

One embodiment provides a system and method for provisioning communications services. A remote device controlled by a user may be linked with a provisioning system. A verbal selection of a menu associated with a library may be received for performing one or more actions within the provisioning system. One or more verbal commands associated with the menu may be received. A determination may be made of an action within the library associated with the one or more verbal commands. The action associated with the one or more verbal commands may be performed in the provisioning system to provision the communications services.

Another embodiment provides a voice controlled provisioning system. The system may include a voice response system for detecting one or more verbal commands received from a remote device operated by a user. The system may also include multiple menus in communications with the voice response system. The menus may be selected based on a voice command. The system may also include multiple libraries associated with each of the menus. The libraries may include multiple voice commands associated with one or more actions. The system may also include a control in communication with the voice response system. The control may be configured to implement an action associated with one or more verbal commands to provision communications services.

Yet another embodiment provides a voice controlled provisioning system. The system may include a processor for executing a set of instructions and a memory for storing a set of instructions. The set of instructions may be operable to link a remote device controlled by a user with a provisional system, receive a verbal selection of a menu associated with a library for performing one or more actions within the provisioning system, receive one or more verbal commands associated with the menu, determine an action within the library associated with the one or more verbal commands, and perform the action associated with the one or more verbal commands in the provisioning system to provision the communications services.

BRIEF DESCRIPTION OF THE DRAWINGS

The accompanying drawings, which are incorporated in and constitute a part of this specification, illustrate embodiments of the present invention.

DETAILED DESCRIPTION OF THE PRESENTLY PREFERRED EMBODIMENTS

Illustrative embodiments provide a system and method for voice activated provisioning of circuits, equipment, and resources for telecommunication services. In telecommunications and as used herein, provisioning means providing telecommunications services to the user or customer, including transmission, wiring, and equipment. Provisioning further refers to the configuration of both hardware and software in order to activate, deactivate, modify, or change telecommunication services for the customer. Provisioning is not equipment, but rather consists of commands and controls for specific telecommunication devices. Provisioning is typically performed by providing typed commands to a provisioning application residing on a computing server through a desktop personal computer, a laptop, or the like, to control telecommunication devices, allocate resources, and track and configure telecommunication services.

One or more menus and libraries may allow a user to provision telecommunications services utilizing voice commands. In one embodiment, a user may alternate between the one or more menus and libraries to speak specific commands or access specific features. In one embodiment, diagnostic and provisioning commands and the associated actions may be separately implemented. The user may alternate between menus by saying "diagnostic" or "provisioning".

Figure 1:
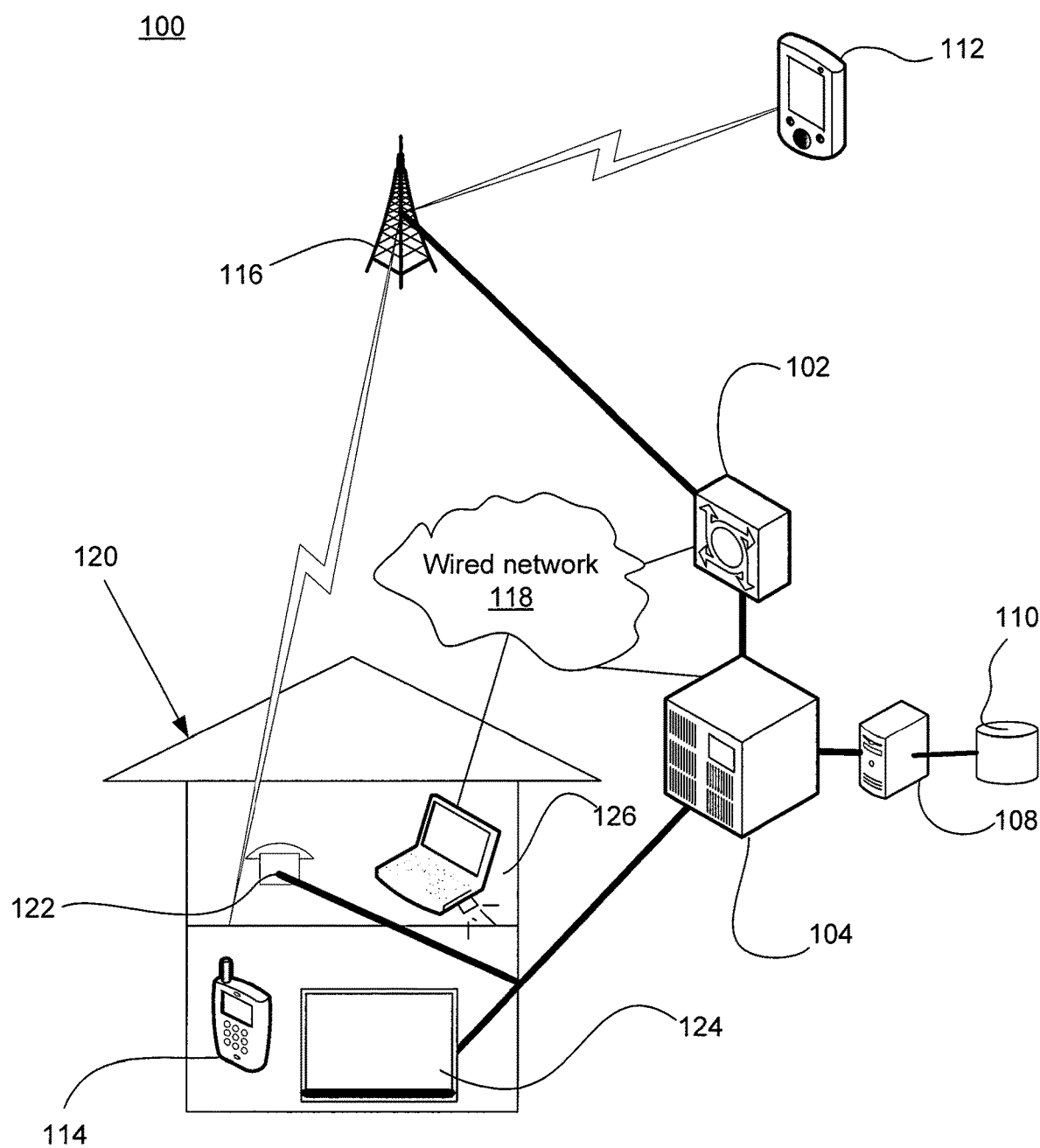
FIG. 1 is a pictorial representation of a communications environment in accordance with an illustrative embodiment.

FIG. 1 is a pictorial representation of a communications environment in accordance with an illustrative embodiment. The communication system 100 of FIG. 1 includes various elements used for wireless and wired communication. The communications environment 100 includes a mobile switching center (MSC) 102, a local exchange 104, provisioning system 108, a database 110, wireless devices 112 and 114, a transmission tower 116, a wired network 118, a home 120, home telephones 122 and 124, and a client 126. The different elements and components of the communications environment 100 may communicate using wireless communications, such as satellite connections, WiFi, WiMAX, CDMA wireless networks, and/or hardwired connections, such as fiber optics, T1, cable, DSL, high speed trunks, and telephone lines.

The provisioning system 108 may be utilized to provision equipment, ports, bandwidth, connections, cards, spectrum, call features, trunks, or other resources, systems, features, devices, or services. The provisioning system 108 may perform provisioning for wired or wireless systems and devices within the communications environment 100. The communications environment 100 may include any number and type of communications service providers providing voice communications, data, Internet, fax, television, Internet protocol television, cable, satellite, and other data, video, media, and voice services.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 112 and 114 may include cellular phones, Blackberry® devices, personal digital assistances (PDA), mp3 players, laptops, evolution data optimized (EDO) cards, multi-mode devices, and other wireless communication devices and elements.

Communications within the communications environment 100 may occur on any number of networks which may include wireless networks, data or packet networks, cable networks, satellite networks, private networks, publicly switched telephone networks (PSTN), the wired network 118, or other types of communication networks. A communications network is infrastructures for sending and receiving messages and signals according to one or more designated formats, standards, and protocols. The networks of the communications environment 100 may represent a single communication service provider or multiple communications services providers. The features, services, and processes of the illustrative embodiments may be implemented by one or more elements of the communications environment 100 independently or as a networked implementation.

In one embodiment, the MSC 102 and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry® devices, car radios, and high definition televisions.

The MSC 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include or communicate with a home location register (HLR) and visitor location register (VLR) that may be used to implement different features of the illustrative embodiments. The provisioning system 108 may also be an integrated part of the MSC 102, or alternatively, may be an externally connected device.

In one embodiment, the provisioning system 108 may include an integrated database for storing custom voice commands, user preferences, electronic profiles, and data. In another embodiment, the provisioning system 108, a server, or other intelligent network device may store user preferences menus, libraries, and voice commands, as further described herein. The user may communicate, interact, or send and receive voice commands to the provisioning system 108 through the telephones 122 and 124, wireless device 112 and 114, or the client 126. The MSC 102 and provisioning system 108 may include any number of hardware and software components. In one embodiment, the MSC 106 is an advanced intelligence network device with software modules equipped to perform provisioning.

The local exchange 104, the MSC 102, and/or other elements of the communications environment 100 may communicate using a signal control protocol, such as a signaling system number 7 (SS7) protocol or TCP/IP protocols. The SS7 protocol or similar protocols are used in publicly switched networks for establishing connections between switches, performing out-of-band signaling in support of the call-establishment, billing, routing, and implementing information-exchange functions of a publicly switched network or the wired network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the provisioning system 108. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home phones 122 and 124. The local exchange 104 may also enable voice over Internet Protocol (VoIP) communication of the home telephones 116 and 118 through a data network. VoIP works by sending voice information in digital form, such as packets, rather than using the traditional circuit-committed protocols of the publicly switched network. The local exchange 104 may be or include a feature server, a call control agent, or an IP gateway for implementing VoIP communications.

The communications environment 100 may further include any number of hardware and software elements that may not be shown in the example of FIG. 1. For example, in order to facilitate VoIP communications, the communications environment 100, the MSC 102, and local exchange 104, in particular, may include additional application servers, media servers, service brokers, call agents, edge routers, gateways (signaling, trunking, access, sub, etc.), IP network service providers, adapters, exchanges, switches, users, and networks. The provisioning system 108 is similar to the provisioning system 108 except that it is equipped to handle voicemail for landline customers rather than wireless customers. The local exchange 104 or other components of a wire line network, such as a data, PSTN, VoIP, or other wired network may implement the features and perform the methods herein described.

The provisioning system 108 may include an authentication space. The authentication space may be a partition, module, or other storage or memory of the provisioning system designated by the communications service provider. The authentication space may validate that a user or device, such as client 126, is allowed to authorize the provisioning system 108 to set preferences, implement commands, perform diagnostics, or perform other updates. For example, a user may be first required to provide a secure identifier, such as a username, password, or other authentication code or hardware interface, to verify the user is authorized to make changes within the authentication space.

The authentication information may be also used to create a secure connection between the communications device and the provisioning system 108. The secure connection may be a virtual private network tunnel, an encrypted call, firewall, or other form of secured communications link. The MSC 102 and local exchange 104 may use any number of gateways, proxies, applications, or interfaces for allowing the client 126 to communicate with the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients and communications devices.

The home 120 is an example of a dwelling, residence, or location of a person or group that may utilize any number of communications services. The home 120 is shown as a residence in the illustrated example, however, the home 120 may also be an office, business, structure, or other location wired or otherwise suitably equipped to provide telephone, data, and other communication services to one or more customers. In one embodiment, the provisioning system 108 may be accessed from the home 120 in order to provision services for the home 120 itself or for another remote location. In one embodiment, the home 120 is equipped with multiple communication devices, including home telephone 122 and client 126. The home telephone 122 may be a standard device that provides dialing and voice conversation capabilities. Home telephone 122 may be integrated in any number of other devices or may be used in different forms. For example, the home telephone 122 may be part of an intercom system. In another embodiment, the home telephone 124 may be integrated with a personal computer, such as client 126.

The communications services accessible from the home telephone 122 may include standard telephone service or VoIP telephone service. The home telephone 122 may be VoIP telephones or may be standard telephones that include a modem and/or VoIP adapters for enabling VoIP communications.

The client 126 may be a personal computer for performing and executing programs and instructions and accessing the wired network 118 or a wireless network. However, the client 126 may be any computing device suitable for communicating with the wired network 118 through a network connection. The wired network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the wired network 118. The MSC 102 and local exchange 104 may use a graphical user interface (GUI), such as web portal or program accessible from the client 126 in order to enter and receive voice commands, and user preferences for the provisioning system 108.

In an illustrative embodiment, the user may provide voice commands, or otherwise make selections and communicate commands using devices, such as or similar to, wireless devices 112 and 114, home telephone 122, and client 126.

At any time, a user may select to implement commands. For example, the user may use a command that informs a function trigger of the provisioning system to increase the bandwidth available through a data connection into the home 120, as well as, add three-way calling for the telephone 122. In one example, the user may dial a dedicated number to access the provisioning system. The user may then be required to enter a pass code, account code, password, pin number, or other identifier. The communications and computing devices within the communications environment 100 may be utilized for any variety of interactions with the system 100, including correcting service orders and provisioning errors, rebuilding service orders, querying system elements to determine respective provisioning statuses, accessing system databases, requesting various diagnostic reports, ordering devices, equipment and supplies, and maintaining user access and permissions.

The provisioning system 108 may be connected to any number of users or customers through communication links. Each communication link may communicated with a remote terminal (RT) which in turn is connected to the customers via a conventional copper telephone line, fiber optic, Ethernet, cable, wireless, satellite, or other similar connection.

Figure 2:
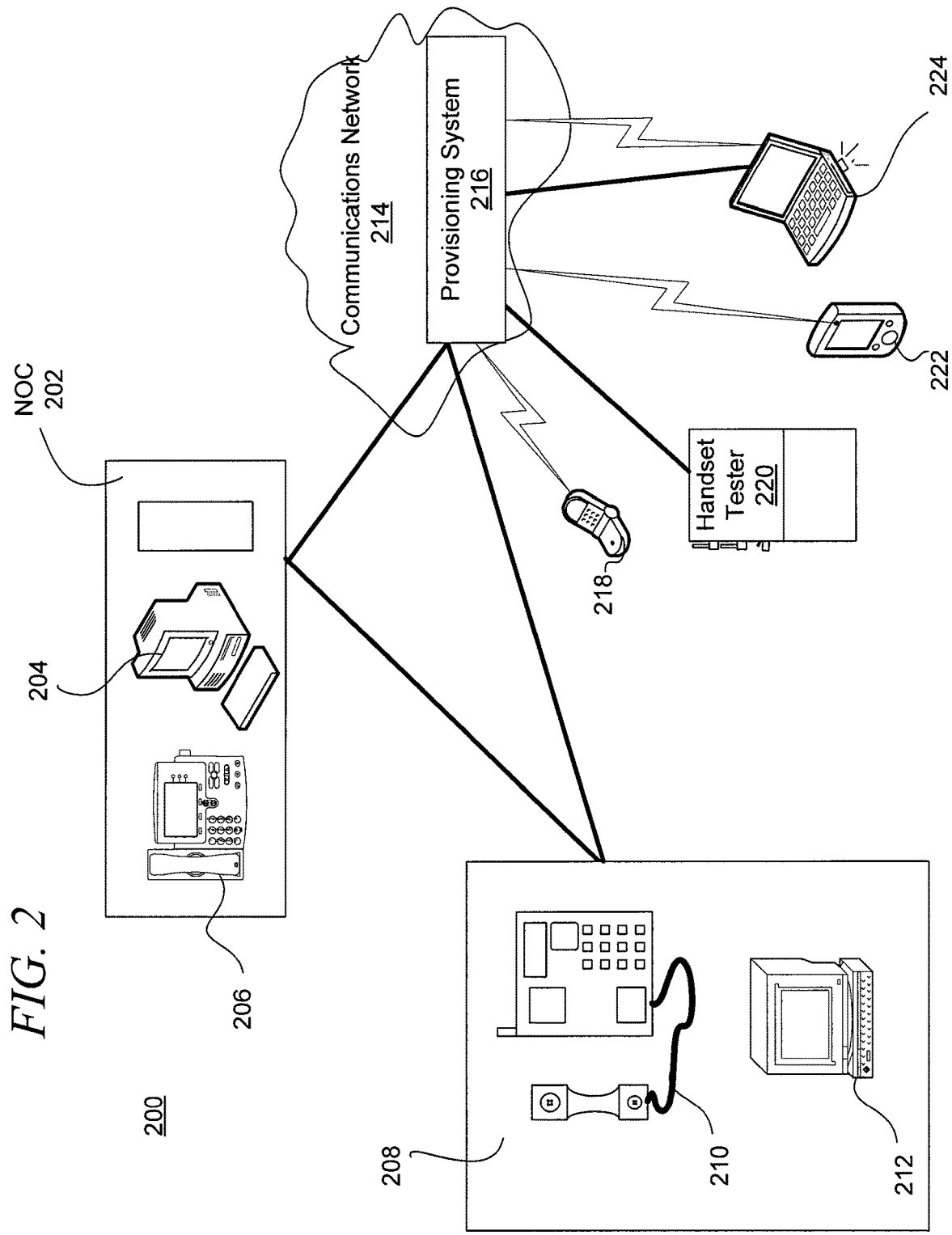
FIG. 2 is pictorial representation of a communications environment in accordance with an illustrative embodiment.

FIG. 2 is pictorial representation of a communications system in accordance with an illustrative embodiment. The communications system 200 is a particular implementation of portions of the communications environment 100 of FIG. 1. The communications system 200 may include a network operation center (NOC) 202, a client 204, a VoIP phone 206, a remote node 208, a phone 210, a client 212, a communications network 214, a provisioning system 216, a cell phone 218, a handset tester 220, a personal digital assistant (PDA) 222, and a laptop 224.

In one embodiment, the communications system 200 may allow one or more users to provision telecommunications equipment and resources utilizing voice commands. In particular, the voice commands may be received by the provisioning system 216 from the VoIP phone 206, the phone 210, the cell phone 218, the handset tester 220, the PDA 222, or the laptop 224. In addition, the voice commands may be received through the clients 204 and 212 when equipped with a microphone.

The provisioning system 216 may include any number of interactive voice menus and libraries that may be utilized to provision resources for the communications network 214. In one embodiment, the one or more ranges of the provisioning system 216 may be configured to provision, diagnose, or control inventory for the communications network 214. The user may automatically or manually select to interface with the provisioning system 216 utilizing audio, visual information and data, or a combination of audio and visual feedback. For example, the VoIP phone 206 may be utilized to access the provisional system 216 to enter voice commands. The provisional system 216 may in turn provide audio confirmation of changes implemented based on the voice command.

In another embodiment, the voice commands communicated to the provisioning system 216 from the VoIP phone 206 may be displayed to a graphical user interface of the VoIP phone 206 allowing the user to visually authenticate those voice commands that are being implemented. In another embodiment, the data or text confirming the provisioning, diagnostic, or other management of the provisioning system 216 may be displayed to the client 204 or another device accessible by the user. As a result, the audio and visual confirmation, cues, prompts, data, and other information may be separately displayed to the user based on convenience. The phone 210 and client 212 may be similarly utilized to communicate voice commands and receive confirmation of provisioning as implemented.

In one embodiment, the provisioning system 216 may be configured to automatically detect whether the device utilized by the user is capable of displaying provisioned or provisioning information. For example, the cell phone 218, PDA 222, and laptop 224 may be configured to receive audio commands and display information from the provisioning system 216. The handset tester 220 however, may only be configured to send and receive voice commands and audible confirmations of the additions, changes, or modifications implemented by the provisioning system 216. As shown, the provisioning system 216 may implement the changes within the communications network 214 regardless of the devices utilized by the user to send voice commands.

In one embodiment, the user may utilize any number of codes, identifiers, numbers, nicknames, shortcuts, or other information to identify circuits, actions, or other steps that are implemented by the provisioning system 216. For example, to expand bandwidth available to a particular customer, the user may use a voice command to specify an account number associated with the customer and then a voice command, such as "increase bandwidth to 10 megabytes". The provisioning system 216 may audibly or visually display menus, commands, data, and information that may be utilized to carry out provisioning. A separate menu type or list may be displayed to the user identifying the codes, phrases, voice commands, and other information that may be spoken by the user to implement provisioning for one or more menus and libraries.

Figure 3:
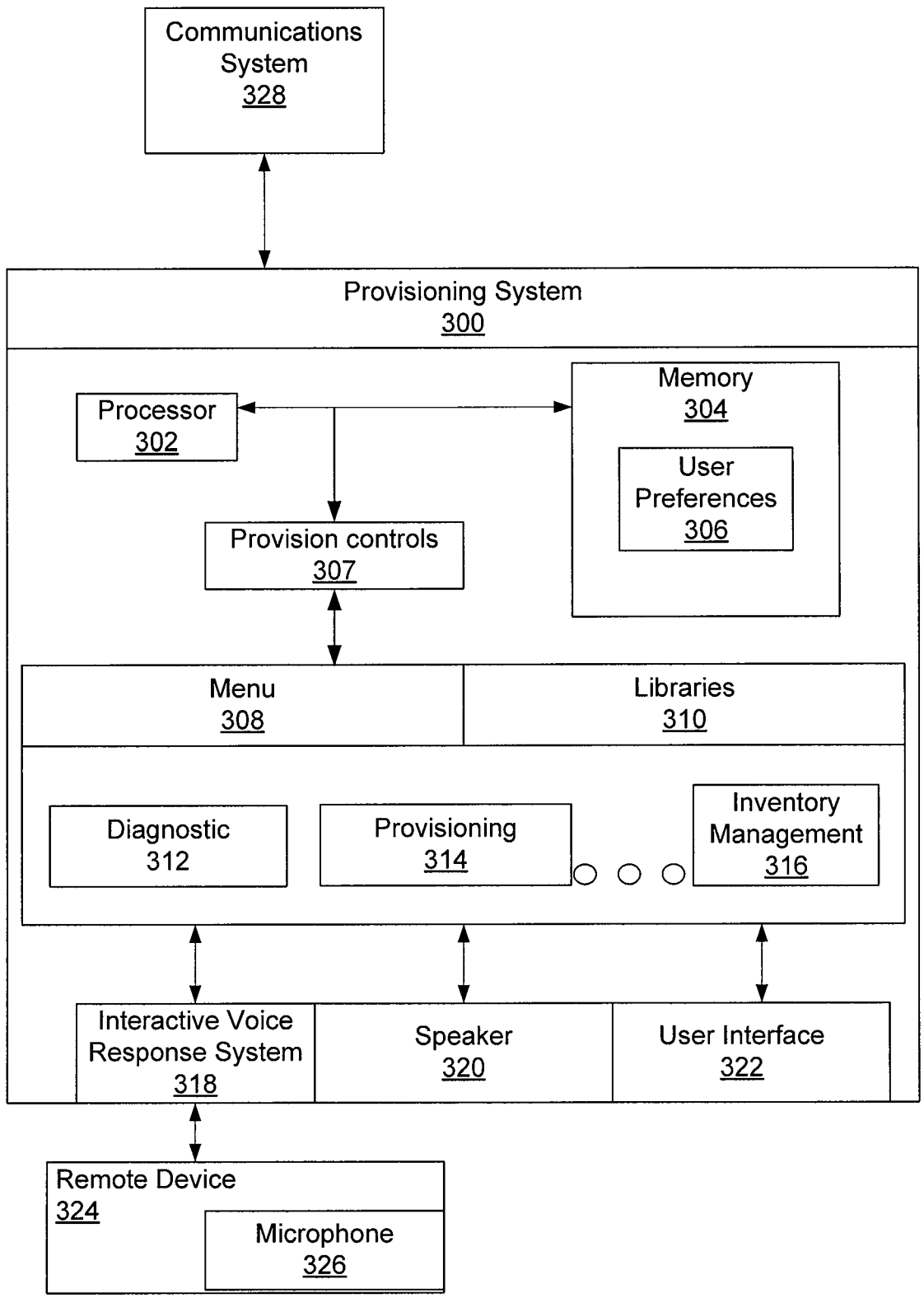
FIG. 3 is a block diagram of a provisioning system in accordance with an illustrative embodiment.

FIG. 3 is a block diagram of a provisioning system in accordance with an illustrative embodiment. The provisioning system 300 is one embodiment of the provisioning system 216 of FIG. 2. The provisioning system 300 may be a server, router, switch, intelligent network device, macro, applications, or modules.

In one embodiment, the provisioning system 300 may include a processor 302, a memory 304, a user preferences 306, a provision controls 307, a menu 308, a library 310, a diagnostic 312, a provisioning 314, an inventory management 316, an interactive voice response (IVR) system 318, a speaker 320, and a user interface 322. The provisioning system 300 may further communicate with a remote device 324, including a microphone 326, as well as a communication system 328.

The provision controls 307 are one or more computing and control devices for provisioning services and resources. The provision controls 307 may include any number of circuits, switches, interfaces and other similar configuration equipment. In one embodiment, the provision controls 307 may determine the current state of the communication system in order to determine whether the selected circuits, services and resources may be allocated. Audible or visual confirmation of the current state, availability, and limitations may be sent to the remote device 324 for further analysis and review. In one embodiment, the provision controls 307 may suggest alternative circuits, modules, resources, solutions, and actions to achieve the desired results. Any number of confirmations, responses, and verifications may be utilized throughout the provisioning process to ensure that provisioning commands are properly interpreted before the associated action is performed within the communication system 328. For example, the user may receive a prompt asking, "Please verify that you want to terminate DSL service for customer number 062177".

The communication system 328 may include the communications network, controlling or management equipment, devices, software, or other elements of the telecommunications or computing network configured to implement provisioning. The remote device 324 is a particular implementation of the VoIP phone 206, client 204, phone, 210, client 212, cell phone 218, PDA 222, or laptop 224 of FIG. 2, individually or in combination.

The processor 302 is circuitry or logic enabled to control execution of a set of instructions. The processor 302 may be a microprocessor, digital signal processor, central processing unit, or other device suitable for controlling an electronic device including one or more hardware and software elements, executing software, instructions, programs, and applications, converting and processing signals and information, and performing other related tasks. The processor 302 may be a single chip or integrated with other computing or communications elements.

The memory 304 is a hardware element, device, or recording media configured to store data for subsequent retrieval or access at a later time. The memory 304 may be static or dynamic memory. The memory 304 may include a hard disk, random access memory, cache, removable media drive, mass storage, or configuration suitable as storage for data, instructions, and information. In one embodiment, the memory 304 and processor 302 may be integrated. The memory may use any type of volatile or non-volatile storage techniques and mediums.

The microphone 326 is an audible input device for receiving voice commands or signals from the user. In one embodiment, the microphone 326 is integrated with the remote device 324, such as a built-in microphone for a cell phone. In another embodiment, the microphone 326 may be an externally linked device, such as a blue tooth headset or wireless communicator that may allow the user to employ hands free operations while performing various tasks. For example, the microphone 326 may be an in-ear blue tooth earplug that may be utilized by a telecommunications technician in order to simultaneously perform provisioning and hands-on work in a central office network in a central office, network operations center, remote node, pedestal, or other locations. In another embodiment, the microphone 326 may be a device configured to communicate directly with the interactive voice response system 318.

The user preferences 306 are settings, parameters, or configurations for one or more users that access the provisioning system 300. The user preferences 306 may include a profile or settings for one or more users. For example, each network operations manager employed by a communications service provider may utilize a separate profile within the user preferences 306 that allows the manager to effectively input voice commands and implement the provisioning as required. The user preferences 306 may include additional stored information, such as accents, preferred commands, shortcuts, identifiers, or other information that may be linked by a specific user for performing customized actions or tasks. For example, a network operations manager may frequently diagnose the performance of routers and trunks leaving the network operations center, and as a result, the manager may have created a voice command that returns information about all routers and trunks by speaking voice command "return NOC output". One or more commands may be linked or abbreviated based on the configurations of each user. The configurations may be created audibly utilizing the interactive voice response system 318 or based on user selections inputted textually through the remote device 324.

The menus 308 are the hierarchy and controls utilized by the provisioning system 300 to send commands to the communications system 328. The communications system 328 may receive commands to implement specific tasks, actions, or features utilizing circuit commands, macros, packets, or other data information or signals communicated to the communications system 328 from the provisioning system 300. In one embodiment, the provisioning system 300 may include a transceiver or interfaced configured to send the provisioning codes, commands, or signals to the communications system 328. The transceiver may also be configured to translate or convert the voice commands into a particular format, standard, or protocol utilized by the communications system 328.

The library 310 are collections of voice commands for implementing a particular type of action. As shown, the menus 308 and the library 310 may include any number of actions, grouping, sections, or hierarchy for implementing the overall provisioning of the communications system 328 in an ordered manner. In one embodiment, the menus 308 and the library 310 may include the diagnostic 312, the provisioning 314, and inventory management 316 sections, categories, menus, libraries, or types.

In one embodiment, the user may be required to speak the category of menu or library to be utilized, such as diagnostic 312, provisioning 314, or inventory management 316. As a result, different voice commands and actions may be associated with each of the menus 308 and the library 310. For example, by verbally speaking "diagnostic", the voice commands implementing diagnostic commands may be activated. Similarly, the provisioning system 300 may present specific prompts, feedback, and interactions from the menus 308. Users may be able to switch between the different menus 308 and library 310 by speaking the specific menu or library that may be utilized. For example, by saying "provisioning" 314 the user may be prompted with the following question: "What type of system do you need to provision today?" The user may then select to enable a new residential phone line that has been recently installed by speaking "diagnostic" 312, the voice command for diagnostics within the library 310 may be activated, and similarly, prompts relating to diagnosing problems, returning results, or otherwise troubleshooting, the network may be presented to the user based on communications between the interactive voice response system 318 and the remote device 324.

In some embodiments, the menus 308 and libraries 310 may have duplicate or crossover voice commands. For example, when a user selects provisioning 314 to enable a new data connection, the inventory management 316 may order or note that one or more data modems have been installed at the customer's premises based on the activation of the data interface or connection. The inventory management 316 tracks the equipment devices and inventory utilized to provide any number of services, features, and conductivity performed by a communications service provider.

The inventory management 316 may also be configured to track personnel, vehicles, and other valuable resources of the communications service provider for providing real time feedback to managers, schedulers, coordinators, and other personnel. The interactive voice response system 318 is a device or software that reads the voice commands communicated from the remote device 324 as received from the user. The interactive voice response system 318 may convert the commands into a format usable by the communications system 328 based on feedback or reference to the menus 308 and library 310. In particular, the interactive voice response system 318 may include a text-to-voice application operable to read information and data to the user.

The provisioning system 300 may also include a speaker 320. The speaker 320 is an audible interface device for providing feedback regarding implemented voice commands. In particular, the speaker 320 may playback information regarding the diagnostic 312, the provisioning 314 and the inventory management 316, as implemented.

In some embodiments, the provisioning system 300 may be in a central location or other facility, location, or building that may allow for direct user interactions. As a result, the user interface 322 and the speaker 320 may allow direct interaction. The user interface is an interface device for displaying and receiving user information. In particular, the user interface 322 may include a mouse, scroll wheel, keyboard, touchpad, or other similar devices for receiving user input and displaying information.

In one embodiment, the provisioning system 300 may be a centralized application or macro that may be also locally stored and executed by devices, such as the remote device 324. As a result, the locally executed provisioning system or software may communicate with the centrally located provisioning system 300. In one embodiment, the menus 308, the libraries 310, as well as the interactive voice response system 318 and user interface 322, may be implemented as part of a provisioning application stored within the memory 304 for execution by the processor 302. In other embodiments, the different elements may be logic, including hardware, software, or a combination thereof, that implements the features as herein described.

Figure 4:
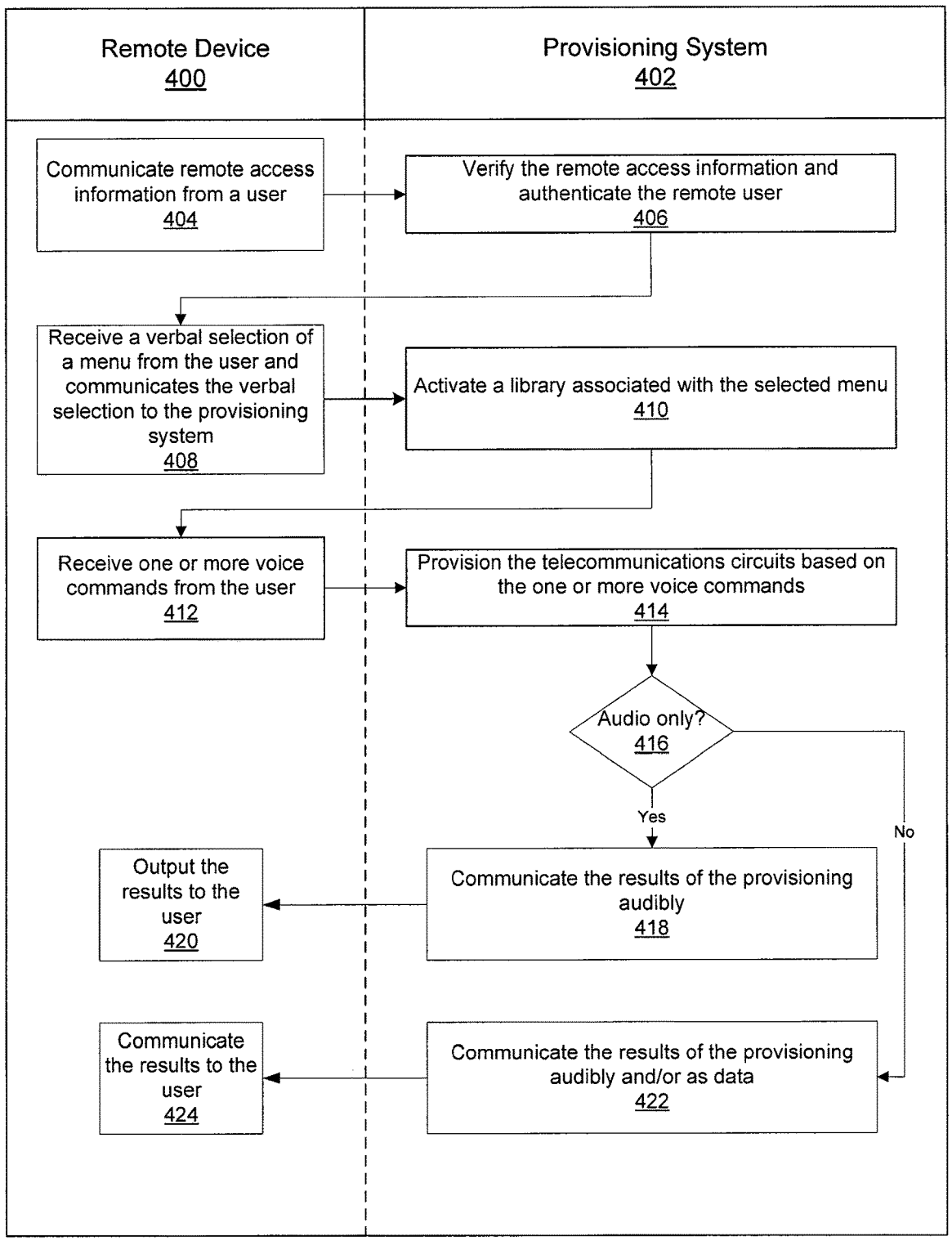
FIG. 4 is flowchart of a process for provisioning based on voice commands in accordance with an illustrative embodiment.

FIG. 4 is flowchart of a process for provisioning based on voice commands in accordance with an illustrative embodiment. The process of FIG. 4 may be implemented by a remote device 400 and a provisioning system 402. The process may begin with the remote device 400 communicating remote access information from a user (step 404). The remote access information may include a user name, password, account number, or other identifier for the user. In one embodiment, the remote access information may be a dedicated phone number, such as a "1-800" number that the user may call to implement provisioning.

Next, the provisioning system 402 verifies the remote access information and authenticates the remote user (step 406). The user may be required to be authenticated in order to ensure that only authorized personnel make changes within the communications network and system.

Next, the remote device 400 receives a verbal selection of a menu from the user and communicates the verbal selection to the provisioning system (step 408). In one embodiment, the user may be required to specify a category or type of actions implemented by the provisioning system 402. For example, the verbal selection may be diagnostic, provisioning, inventory management, personnel, equipment, or other similar categories. In another embodiment, the user may not be required to provide a selection of the menu and instead be automatically given voice commands.

Next, the provisioning system 402 activates a library associated with the selected menu (step 410). The library may include a specific voice command or other features that are distinctive for each menu. For example, different voice commands or similar words may have different context or meanings based on whether the user is performing diagnostics, provisioning circuits, bandwidth, features, services, or applications. For example, the voice commands available to the user for running diagnostics and provisioning may be distinct. Similarly, switching between menus may provide a more orderly methodology for implementing tasks and work projects.

Next, the remote device 400 receives one or more voice commands from a user (step 412). The user may specify one or more commands based on conditions, parameters, and configurations allowable by the provisioning system 402. In one embodiment, the provisioning system 402 may only implement a single command or type of command at a time. In another embodiment, the user may speak any number of commands for subsequent implementation.

Next, the provisioning system 402 provisions the telecommunications circuit based on one or more voice commands (step 414). As previously described, provisioning may include running diagnostics, provisioning circuits and managing software, managing inventory and other processes that may be related to managing services provided by the communications service provider. Next, the provisioning system 402 determines whether there is audio only (step 416). The determination of step 416 may be made based on analysis of the remote device 400. For example, the remote device 400 may be a cell phone that is only configured for voice communications.

In another embodiment, the remote device 400 may be a laptop that is configured for both voice communications and displaying information. The determination of step 416 may alternatively be made based on feedback from the user. For example, even if the device is capable of receiving and displaying information, the user may select to interact with the provisioning system exclusively through a voice recognition system. If the provisioning system 402 determines to utilize audio only in step 416, the provisioning system 402 communicates the results of the provisioning audibly (step 418). The remote device 400 outputs the results to a user (step 420). The remote device 400 may output the results utilizing a speaker, headphones, or other audible communications systems. If the provisioning system 402 determines not to utilize audio only in step 416, the provisioning 402 communicates the results of the provisioning audibly and/or as data (step 422). The remote device 400 communicates the result to the user (step 424).

The communication and feedback of steps 418 and 422 may be implemented at any time as the user provides voice commands. For example, if the voice command is not understood, the provisioning system 402 may send a message to the user through a remote device 400 requesting that the user once again speak the voice command. The results displayed in step 422 may include a summary or confirmation of provisioning implemented by the provisioning system 402.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method for provisioning a telecommunication circuit, the method comprising:
   receiving, with a provisioning system, a voice call from a remote device controlled by a user;
   authenticating, with the provisioning system, the user on the voice call as being authorized to access the provisioning system;
   based on a determination that the user is authorized to access the provisioning system, linking the remote device controlled by the user with the provisioning system via a virtual private network tunnel or an encrypted call;
   receiving, via the voice call, an initial verbal selection of a category of menu to be utilized by the provisioning system, wherein the category of menu is selected from a plurality of menu categories;
   displaying the initial verbal selection of a category of menu on a graphical user interface;
   based on the initial verbal selection of the category of menu to be utilized by the provisioning system, activating a plurality of secondary verbal commands associated with the category of menu initially selected, wherein the plurality of menu categories have similar secondary verbal commands, and wherein activating the plurality of secondary verbal commands associated with the category of menu initially selected comprises only activating the plurality of secondary verbal commands associated with the category of menu initially selected;
   receiving, via the voice call, two or more secondary verbal commands of the plurality of secondary verbal commands comprising at least two different and separate verbal commands, each of the at least two different and separate verbal commands associated with a different function associated with the category of menu initially selected, wherein the two or more secondary verbal commands are selected from a plurality of secondary verbal commands associated with the initially selected menu category, and wherein the different functions associated with each of the at least two different and separate verbal commands are subsequently implemented, without additional input from the user, to provision the telecommunications circuit and run a diagnostic test on the telecommunications circuit; and
   based on the two or more secondary verbal commands received via the voice call, allocating the telecommunications circuit to the user.

2. The method according to claim 1, wherein the remote device and the provisioning system are linked through a dedicated phone line.

3. The method according to claim 1, wherein the remote device is a Voice over Internet Protocol (VoIP) phone.

4. The method according to claim 1, wherein the plurality of menus and the plurality of secondary verbal commands include at least diagnostics, provisioning, and inventory.

5. The method according to claim 1, further comprising:
   communicating a response indicating to the user whether the telecommunications circuit was provisioned.

6. The method according to claim 5, wherein the response is a text-to-voice conversion performed by the provisioning system.

7. The method according to claim 5, further comprising;
   determining whether the remote device is configured to receive visual information; and
   automatically displaying the one or more commands and the response to the remote device in response to the user input and determining the remote device is configured to receive visual information.

8. The method according to claim 1, wherein the command to provision the telecommunication circuit is associated with the one or more verbal commands utilizing speech recognition.

9. The method according to claim 1, wherein the user associates each of the plurality of voice commands with a voice of the user and one or more of a plurality of actions.

10. The method according to claim 1, further comprising:
determining a current state of the provisioning system; and
configuring the telecommunications circuit utilizing the provisioning system.

11. The method of claim 1, wherein at least one of the two or more secondary verbal commands comprises a command to increase bandwidth through a data connection into the customer premises, and wherein allocating the telecommunications circuit comprises increasing bandwidth from a service provider to the customer premises via the data connection into the customer premises.

12. The method of claim 1, further comprising:
suggesting a plurality of actions associated with the one or more secondary verbal commands;
receiving an action selection from the user; and
performing the selected action to allocate the telecommunications unit to the user.

13. A voice controlled provisioning system, the system comprising:
a voice response system for receiving a voice call from a remote device controlled by a user and detecting one or more verbal commands received from a remote device operated by a user;
a graphical user interface for displaying the one or more verbal commands received from the remote device;
a plurality of categories of menus in communication with the voice response system;
a plurality of command libraries associated with each of the plurality of categories of menus, the libraries including a plurality of secondary voice commands associated with one or more actions; and
a control in communication with the voice response system, the control being configured to:
receive the voice call from the remote device controlled by the user;
authenticate the user on the voice call as being authorized to access the voice controlled provisioning system;
based on a determination that the user is authorized to access the voice controlled provisioning system, link the remote device controlled by the user with the voice controlled provisioning system via a virtual private network tunnel or an encrypted call;
receive, via the voice call, an initial verbal selection of the category of menu to be utilized by the provisioning system, wherein the category of menu is selected from the plurality of menu categories;
display the initial verbal selection of the category of menu on the graphical user interface;
based on the initial verbal selection of the category of menu to be utilized by the voice controlled provisioning system, activate a plurality of secondary verbal commands associated with the category of menu initially selected, wherein the plurality of menu categories have similar secondary verbal commands, and wherein activating the plurality of secondary verbal commands associated with the category of menu initially selected comprises only activating the plurality of secondary verbal commands associated with the category of menu initially selected;
receive, via the voice call, two or more secondary verbal commands of the plurality of secondary verbal commands comprising at least two different and separate verbal commands, each of the at least two different and separate verbal commands associated with a different function associated with the category of menu initially selected, wherein the secondary verbal commands are selected from the plurality of secondary verbal commands associated with the initially selected menu category, and wherein the different functions associated with each of the at least two different and separate verbal commands are subsequently implemented, without additional input from the user, to provision a telecommunications circuit and run a diagnostic test on the telecommunication circuit; and
based on the two or more secondary verbal commands received via the voice call, allocate the telecommunications circuit to the user.

14. The system according to claim 13, wherein the control sends a command to one or more remote devices for implementing the provisioning.

15. The system according to claim 13, wherein the voice response system utilizes speech recognition to determine the action associated with the one or more verbal commands, wherein only the voice commands of the selected library and menu are available to the user.

16. The system according to claim 13, further comprising user preferences in communication with the voice response system, wherein the user preferences store information for implementing the one or more voice commands based on user input, and wherein the plurality of menus and the plurality of libraries include at least diagnostics and provisioning.

17. A voice controlled provisioning system, the system comprising:
a processor for executing a set of instructions;
a non-transitory memory for storing the set of instructions, the set of instructions being operable to:
receive a voice call from a remote device controlled by a user;
authenticate the user on the voice call as being authorized to access the voice controlled provisioning system;
based on a determination that the user is authorized to access the voice controlled provisioning system, link the remote device controlled by the user with the voice controlled provisioning system via a virtual private network tunnel or an encrypted call;
receive, via the voice call, an initial verbal selection of a category of menu to be utilized by the voice controlled provisioning system, wherein the category of menu is selected from a plurality of menu categories;
display the initial verbal selection of a category of menu on a graphical user interface;
based on the initial verbal selection of the category of menu to be utilized by the voice controlled provisioning system, activate a plurality of secondary verbal commands associated with the category of menu initially selected, wherein the plurality of menu categories have similar secondary verbal commands, and wherein activating the plurality of secondary verbal commands associated with the category of menu initially selected comprises only activating the plurality of secondary verbal commands associated with the category of menu initially selected;

receive, via the voice call, two or more secondary verbal commands of the plurality of secondary verbal commands comprising at least two different and separate verbal commands, each of the at least two different and separate verbal commands associated with a different function associated with the category of menu initially selected, wherein the two or more secondary verbal commands are selected from a plurality of secondary verbal commands associated with the initially selected menu category, and wherein the different function associated with each of the at least two different and separate verbal commands are subsequently implemented, without additional user input, to provision a telecommunications circuit and run a diagnostic test on the telecommunication circuit; and based on the two or more secondary verbal commands received via the voice call, allocate the telecommunications circuit to the user.

18. The system according to claim 17, wherein the set of instructions are further operable to switch between a plurality of menus in response to a verbal command.

19. The system according to claim 17, wherein the set of instructions are further operable to:

display information regarding the allocation of the telecommunications circuit to the remote device in response to the user input and a determination the remote device is operable to display the information; and associate each of a plurality of voice commands with a voice of the user and one or more of a plurality of actions.

20. The system according to claim 17, wherein the set of instructions are further operable to:

audibly play information to the remote device about the allocation of the telecommunications circuit, wherein the voice controlled provisioning system includes a plurality of menus and a plurality of libraries comprising at least diagnostics and provisioning.

* * * * *